(12) United States Patent
Min

(10) Patent No.: US 12,128,849 B2
(45) Date of Patent: Oct. 29, 2024

(54) ROOF AIRBAG DEVICE

(71) Applicant: HYUNDAI MOBIS CO., LTD., Seoul (KR)

(72) Inventor: Byung Ho Min, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/480,162

(22) Filed: Oct. 3, 2023

(65) Prior Publication Data

US 2024/0166159 A1 May 23, 2024

(30) Foreign Application Priority Data

Nov. 22, 2022 (KR) .................... 10-2022-0157437
Dec. 14, 2022 (KR) .................... 10-2022-0175082
Dec. 28, 2022 (KR) .................... 10-2022-0187338

(51) Int. Cl.
| | |
|---|---|
| *B60R 21/2334* | (2011.01) |
| *B60R 21/16* | (2006.01) |
| *B60R 21/213* | (2011.01) |
| *B60R 21/231* | (2011.01) |

(52) U.S. Cl.
CPC ........ *B60R 21/2334* (2013.01); *B60R 21/213* (2013.01); *B60R 2021/161* (2013.01); *B60R 2021/23192* (2013.01)

(58) Field of Classification Search
CPC .............. B60R 21/2334; B60R 21/213; B60R 2021/23192; B60R 21/08
See application file for complete search history.

(56) References Cited

U.S. PATENT DOCUMENTS

| | | | | |
|---|---|---|---|---|
| 4,657,105 A | * | 4/1987 | Miyada | .................... B60R 21/08 180/274 |
| 5,167,296 A | * | 12/1992 | Schreier | ..................... B60J 1/12 180/281 |
| 5,433,477 A | * | 7/1995 | Kraus | ..................... B60R 21/08 280/753 |
| 5,707,075 A | * | 1/1998 | Kraft | ...................... B60R 21/08 280/730.2 |
| 6,189,960 B1 | * | 2/2001 | Mumura | ................ B60J 7/0015 180/281 |

(Continued)

FOREIGN PATENT DOCUMENTS

| | | |
|---|---|---|
| KR | 10-2017-0057540 A | 5/2017 |
| KR | 10-2021-0074582 A | 6/2021 |

*Primary Examiner* — Timothy Wilhelm
(74) *Attorney, Agent, or Firm* — NovoTechIP International PLLC

(57) ABSTRACT

The present invention relates to a deployment guide mechanism for a roof airbag device that enhances assembly performance and productivity of the product by improving an assembly structure of a guide wire and a spring. The present invention discloses a deployment guide mechanism including a guide wire fixed to one side of a roof portion and provided in the lengthwise direction in which the roof airbag deploys, a guide housing fixed to the other side of the roof portion, a stopper supported in the guide housing and coupled to an end of the guide wire in a threaded coupling structure, and an elastic member providing an elastic restoring force to the stopper in the lengthwise direction of the guide wire toward the other side of the roof portion.

16 Claims, 8 Drawing Sheets

(56) References Cited

U.S. PATENT DOCUMENTS

| | | | | |
|---|---|---|---|---|
| 6,679,480 | B1* | 1/2004 | Hara | E04H 17/124 |
| | | | | 256/37 |
| 10,449,923 | B2* | 10/2019 | Son | B60R 21/233 |
| 10,471,924 | B2* | 11/2019 | Min | B60R 21/214 |
| 10,556,564 | B2* | 2/2020 | Lee | B60R 21/233 |
| 10,604,103 | B2* | 3/2020 | Lee | B60R 21/2338 |
| 10,604,104 | B2* | 3/2020 | Raikar | B60R 21/0428 |
| 10,836,345 | B2* | 11/2020 | Koo | B60R 21/2334 |
| 11,014,523 | B2* | 5/2021 | Min | B60R 21/2176 |
| 11,142,157 | B2* | 10/2021 | Kim | B60N 2/0272 |
| 11,186,246 | B2* | 11/2021 | Min | B60R 21/23138 |
| 11,358,556 | B2* | 6/2022 | Min | B60R 21/214 |
| 11,390,231 | B2* | 7/2022 | Lee | B60R 21/08 |
| 11,590,924 | B1* | 2/2023 | Ko | B60R 21/207 |
| 2008/0143146 | A1* | 6/2008 | Alagil | B60R 21/13 |
| | | | | 296/210 |
| 2017/0015269 | A1* | 1/2017 | Min | B60R 21/214 |
| 2017/0267199 | A1* | 9/2017 | Schütt | B60R 21/08 |
| 2019/0202395 | A1* | 7/2019 | Obayashi | B60R 21/231 |
| 2021/0138987 | A1* | 5/2021 | Lee | B60R 21/2334 |
| 2021/0155197 | A1* | 5/2021 | Jeong | B60R 21/2334 |
| 2021/0179003 | A1* | 6/2021 | Min | B60R 21/214 |
| 2021/0179004 | A1* | 6/2021 | Lee | B60R 21/214 |
| 2021/0237675 | A1* | 8/2021 | Min | B60R 21/214 |

* cited by examiner

320

320

ROOF AIRBAG DEVICE

CROSS-REFERENCE TO RELATED APPLICATIONS

The present application claims priority to Korean Patent Applications No. 10-2022-0157437 filed Nov. 22, 2022, No. 10-2022-0175082 filed Dec. 14, 2022, and No. 10-2022-0187338 filed Dec. 28, 2022, the entire contents of which is incorporated herein for all purposes by this reference.

TECHNICAL FIELD

The present invention relates to a roof airbag device having an improved structure for guiding the deployment operation of an airbag.

BACKGROUND

A roof airbag protects a passenger by covering the roof surface with a cushion in the event of a vehicle rollover.

For example, if a rollover accident occurs to a vehicle equipped with a sunroof, there is a risk that a passenger may be ejected through an opening in the roof when the sunroof glass shatters. A roof airbag cushion covering the roof surface prevents the passenger from being ejected from the vehicle so that injuries to the neck area of the passenger are reduced.

On the other hand, a deployment guide mechanism for a roof airbag is installed at the end of a guide wire of the roof airbag and is operated for the stable deployment of the roof airbag.

In other words, when the roof airbag deploys, the length of the guide wire temporarily extends as a spring installed inside a guide housing is compressed, and thus, the roof airbag may stably deploy.

After the roof airbag deploys, the compressed spring is restored and tension is applied to the guide wire so that the extent of passenger ejection through the roof portion is reduced.

For the deployment operation of the roof airbag, the guide wire needs to maintain a certain level of tension while the roof airbag remains assembled in the sunroof module and the guide wire is fastened to the spring.

To this end, a wire holder is fixed to the guide wire and supports the spring in a compressed state to maintain tension in the guide wire.

However, since tension adjustment of the guide wire is difficult, when there is a need to change the tension of the guide wire, it is necessary to make a new deployment guide mechanism for replacement so that there is a problem that the man-hours for maintenance increase and additional cost is incurred.

The matters described above as background technology are intended to provide a better understanding of the background of the present invention and should not be considered as acknowledging that the present invention pertains to the prior art already known to those skilled in the art.

SUMMARY

The present invention is designed to resolve the issues described above, and an object of the present invention is to provide a roof airbag device that enhances assembly performance and productivity of the product while allowing convenient adjustment of the guide wire tension by improving the structure for guiding the deployment operation of the roof airbag.

Another object of the present invention is to provide a roof airbag device in which the guide wire is protected from damage when the cushion deploys and the noise caused by rattles that may be generated in the roof airbag is prevented.

According to the present invention to resolve the issues described above, a roof airbag device includes a guide wire fixed to one side of a roof portion and provided in the lengthwise direction in which the roof airbag deploys, a guide housing fixed to the other side of the roof portion, a stopper supported in the guide housing and coupled to the end of the guide wire, and an elastic member is configured to provide an elastic restoring force to the stopper in the lengthwise direction of the guide wire toward the other side of the roof portion.

A male thread portion of a predetermined length or more may be formed at the end of the guide wire, and a female thread portion may be formed in the stopper in a hole shape so that the male thread portion may be thread-coupled to the female thread portion.

One end of a guide holder may be fixed to the guide wire and the male thread portion may be formed at the other end of the guide holder.

The cross-sectional area of a fixing portion to which the guide wire and the guide holder are fixed may be larger than the cross-sectional area of the male thread portion bordering the fixing portion.

The fixing portion may be fixed by swaging so that the cross-sectional area of the fixing portion may be expanded.

A housing cap is coupled to one end of the guide housing so that a stopper may be supported by the inner surface of the housing cap, and a hollow portion is formed in the center of the housing cap so that the guide wire protruding from the outer surface of the stopper may be positioned in the hollow portion.

The elastic member may be a spring supported by the stopper in the guide housing.

One end of the spring may be supported by the stopper and the other end of the spring may be supported by a support plate formed at the other end of the guide housing in a shape bent in the inner radial direction.

A soundproofing member provided between the guide housing and the stopper may be further included.

The soundproofing member may be provided on the outer surface of the stopper in contact with the housing cap coupled to the guide housing.

When the roof airbag deploys, the stopper may move forward and compress the elastic member by the friction resistance acting on the guide wire.

When the deployment of the roof airbag is completed, the stopper may move backward and tighten the guide wire by the tensile force of the elastic member.

The stopper may be fastened to or unfastened from the guide wire by a fastening device.

A hollow portion is formed in the stopper in the lengthwise direction of the guide wire for the guide wire to pass through the stopper, and the fastening device is fastened to the stopper in a direction orthogonal to the guide wire so that the guide wire may be pressed against to the inner surface of the stopper and fastened thereto.

A fastening hole may be formed in the stopper, and the fastening device may be fastened to the fastening hole in a threaded fastening structure.

One end of the stopper is supported in the guide housing and the other end of the stopper extends toward the other side of the roof portion such that the extending portion is exposed to the outside of the guide housing, and a fastening device may be fastened to the extending portion.

The housing cap is coupled to one end of the guide housing so that the stopper is supported by the inner surface of the housing cap, and a hollow portion is formed in the housing cap in the lengthwise direction of the guide wire so that one end of the stopper may be supported by the inner surface of the housing cap and the other end of the stopper may pass through the housing cap.

Through the solutions described above, the present invention achieves the effect of facilitating the assembly between the guide wire and the stopper and thus greatly improving assembly performance and productivity of the deployment guide mechanism by assembling the stopper to the guide wire in a threaded coupling structure.

Further, the coupling position of the stopper may be adjusted through the threaded coupling structure between the guide wire and the stopper. Accordingly, the elastic restoring force of the elastic member changes according to the coupling position of the stopper so there is also an advantage that the tension of the guide wire can be adjusted.

In addition, there is also an effect of preventing damage to the guide wire that guides the deployment of the cushion when the cushion deploys and preventing the generation of noise due to rattles that may occur in the roof airbag.

Further, since the tension of the guide wire is easily controlled by simply manipulating the fastening device, there is no need to make a new deployment guide mechanism for replacement so that there is an effect of reducing the man-hours for the maintenance of the deployment guide mechanism and avoiding additional costs.

DETAILED DESCRIPTION

Figure 1:
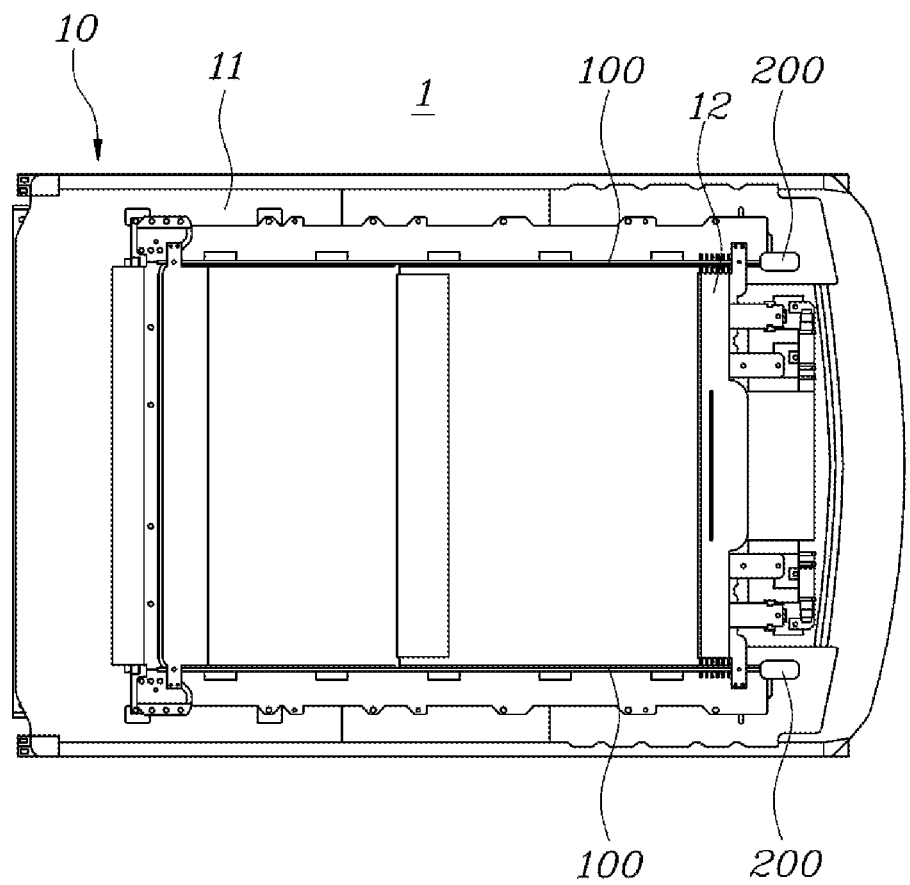
FIG. 1 is a view illustrating a guide wire and deployment guide mechanism installed in a roof airbag assembly.

The embodiments disclosed herein will be described in detail with reference to the accompanying drawings. However, the same or similar components will be given the same reference numerals regardless of the drawing numbers, and the repetitive descriptions regarding these components will be omitted.

The suffixes "module" and "unit" for the components used in the following description are given or interchangeably used only to facilitate the writing of the specification, without necessarily indicating a distinct meaning or role of their own.

When it is determined that the specific description of the related and already known technology may obscure the essence of the embodiments disclosed herein, the specific description will be omitted. Further, it is to be understood that the accompanying drawings are only intended to facilitate understanding of the embodiments disclosed herein and are not intended to limit the technical ideas disclosed herein are not limited to the accompanying drawings and include all the modifications, equivalents, or substitutions within the spirit and technical scope of the present invention.

The terms including ordinal numbers such as first, second, and the like may be used to describe various components, but the components are not to be limited by the terms. The terms may only be used for the purpose of distinguishing one component from another.

It is to be understood that when a component is referred to as being "connected" or "coupled" to another component, the component may be directly connected or coupled to the other component, but other components may be interposed therebetween. In contrast, it is to be understood that when a component is referred to as being "directly connected" or "directly coupled" to another component, no other component is interposed therebetween.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

A mechanism (deployment guide mechanism) guiding the deployment operation of a roof airbag cushion 12 is used to assist the stable deployment operation of the cushion 12 in the operating process of the roof airbag. A roof airbag assembly 10 including a modularized roof airbag is installed in a roof portion 1 of a vehicle, and the deployment guide mechanism is assembled onto the roof airbag assembly 10.

The operation of the roof airbag along with the configuration of the roof airbag assembly 10 will be briefly described with reference to FIG. 1.

The roof airbag cushion 12 deploys in the form of covering the roof glass in the roof of vehicles including vehicles having a relatively large panoramic sunroof as well as vehicles having a relatively small regular sunroof.

An inflator is connected to the cushion 12 in the roof airbag, and gas is generated by the ignition operation of an ignition device.

An opening is formed in a roof frame 11 forming the roof airbag assembly 10, and guide wires 100 are respectively installed on the right and left sides of the opening.

Figure 5:
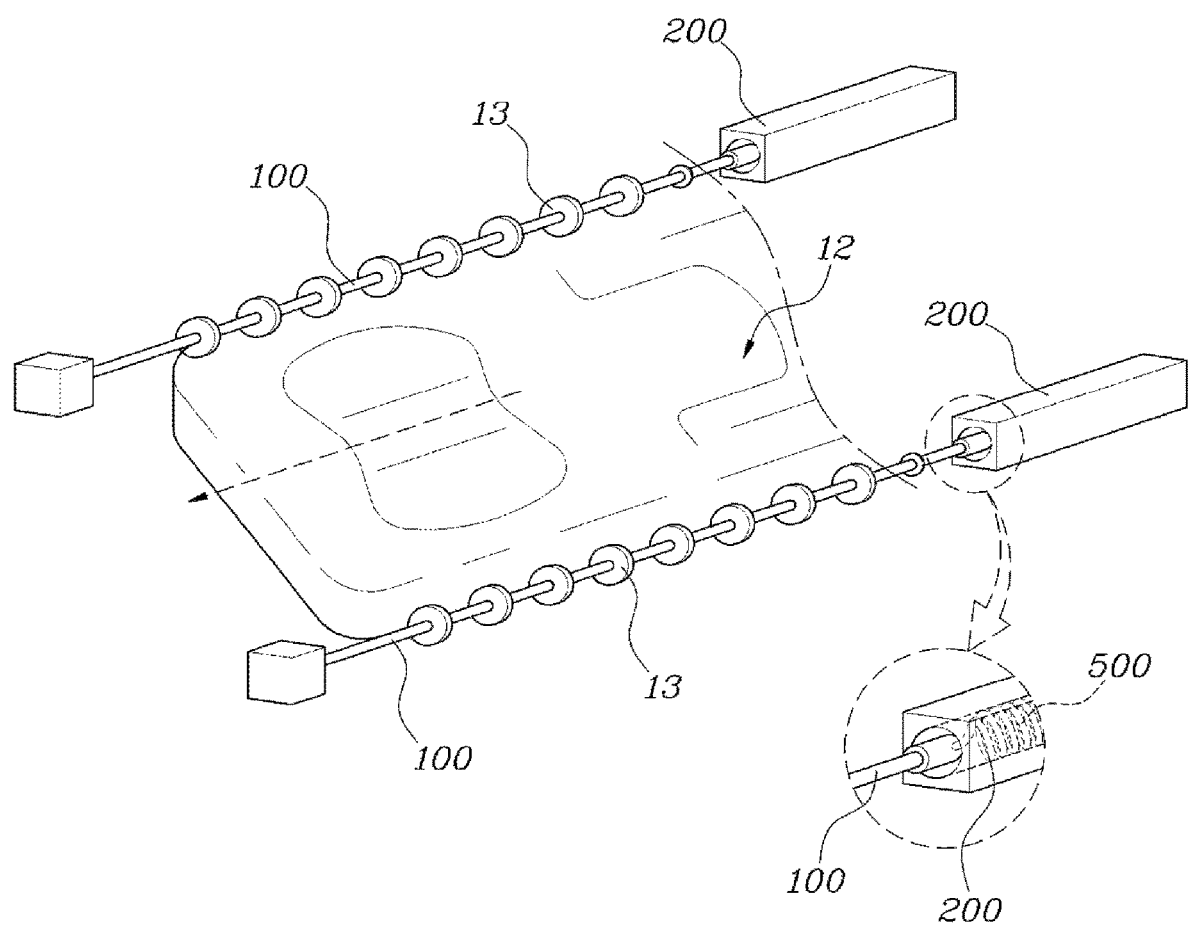
FIG. 5 is a view for describing the cushion deployment operation of the present invention.

In addition, as illustrated in FIG. 5, circular guide rings 13 are fastened to both sides of the cushion 12 at predetermined intervals in the front-to-rear lengthwise direction when the cushion 12 deploys. The guide rings 13 are inserted onto the guide wires 100 and move forward and backward along the guide wires 100 in the deploying process of the cushion 12 to guide the deployment operation of the cushion 12.

In other words, in the event of a vehicle accident, when a controller such as an airbag control unit (ACU) issues an ignition command to the inflator and gas is generated by the ignition of the inflator, gas is supplied into the cushion 12, the cushion 12 starts to deploy, and the guide rings 13 fastened to the cushion 12 move along the guide wire 100 in the deployment direction of the cushion 12 in the deploying process so that the cushion 12 deploys under the roof glass in the front-to-rear direction.

Accordingly, the cushion 12 covers the roof glass to prevent passengers from being ejected to the outside through the opening of the roof.

However, the guide rings 13 slide by the deploying force of the cushion 12 and slide while making downward contact with the guide wire 100 by the gravity acting on the guide rings 13.

At this time, friction resistance may be generated downward from the guide wire 100 as the guide ring 13 and the guide wire 100 comes into contact with each other.

When the guide wire 100 remains tightened during the operation of the roof airbag due to such action, there is a problem that the guide wire 100 may break or may be damaged due to excessive friction between the guide wire 100 and the guide rings 13.

Accordingly, a deployment guide mechanism is provided to reduce the resistance caused by the friction between the guide rings 13 and the guide wire 100, that is, the deployment resistance when the cushion 12 deploys.

Figure 2:
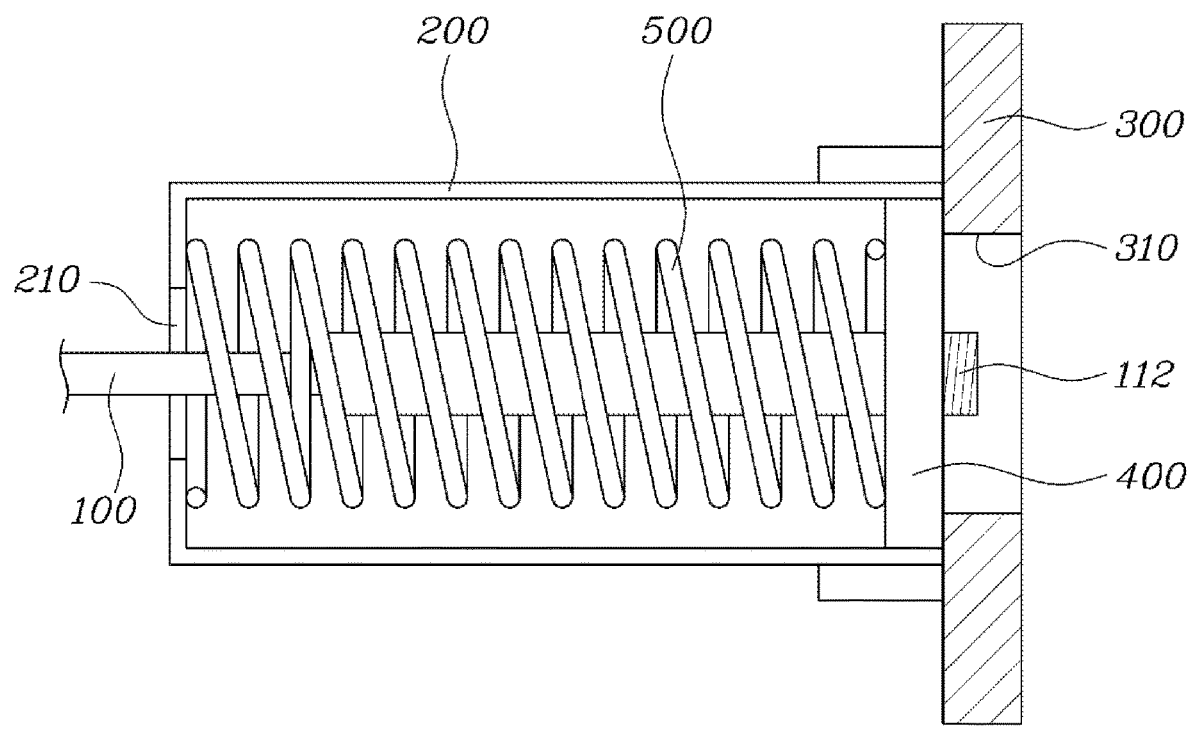
FIG. 2 is a side view of a deployment guide mechanism installed in a roof airbag device of the present invention.

On the other hand, FIG. 2 shows that the roof airbag device of the present invention includes the guide wire 100 fixed to one side of the roof portion 1 and provided in the lengthwise direction in which the roof airbag deploys, a guide housing 200 fixed to the other side of the roof portion 1, a stopper 400 supported in the guide housing 200 and coupled to an end of the guide wire 100 in a threaded coupling structure, and an elastic member 500 providing an elastic restoring force to the stopper 400 in the lengthwise direction of the guide wire 100 toward the other side of the roof portion 1.

For example, the guide wires 100 are respectively installed right and left under the roof portion 1 in the front-to-rear direction of the vehicle. One end of the guide wire 100 is fixed to the front of a roof frame 11 forming the roof airbag assembly 10 and the other end of the guide wire 100 is coupled to the stopper 400 in a threaded coupling structure.

The stopper 400 is formed in a disk shape and is provided in the guide housing 200 formed in a cylindrical shape. The stopper 400 is provided to be movable back and forth in the guide housing 200. And the guide housing 200 is fixed to the rear of the roof frame 11.

The elastic member 500 is built into the guide housing 200, and the elastic member 500 is provided to support the stopper 400 such as to give the stopper 400 moving forward a force to move back by its elastic restoring force.

In other words, the stopper 400 supporting the elastic member 500 is assembled in a threaded fastening structure at the end of the guide wire 100 so that an assembly process using a tool such as a screwdriver becomes unnecessary.

Accordingly, the method of supporting the elastic member 500 is simplified by improving the coupling structure between the guide wire 100 and the stopper 400 so that the assembly man-hours are reduced and the assembly performance and productivity of the deployment guide mechanism are enhanced.

Figure 3:
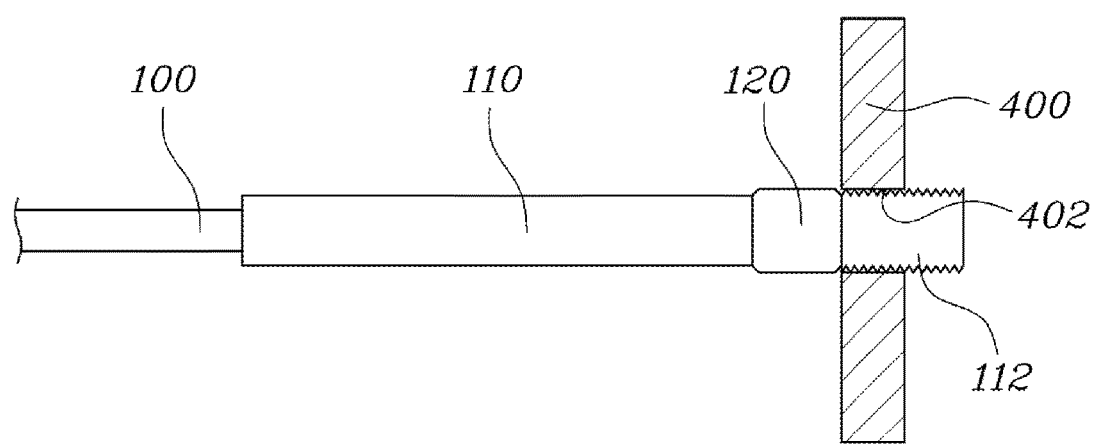
FIG. 3 is a view illustrating a guide wire and a stopper combined according to the present invention.
Figure 4:
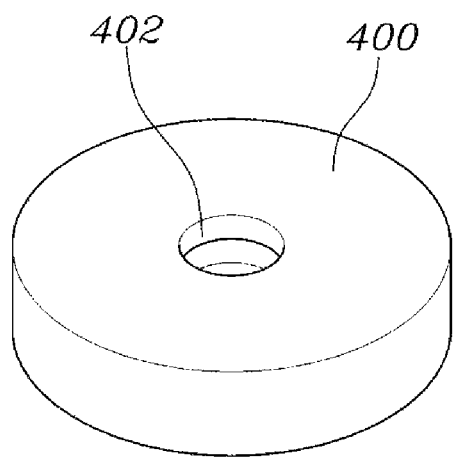
FIG. 4 is a view illustrating a guide wire and a stopper separated according to the present invention.
Figure 4:
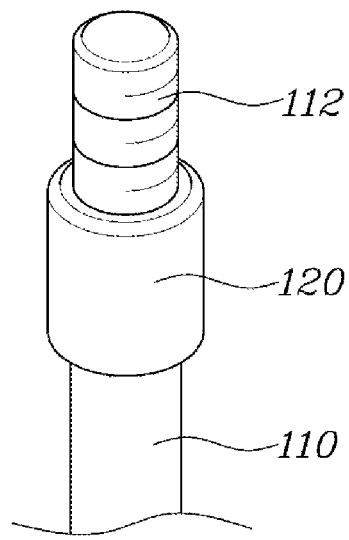

On the other hand, FIGS. 3 and 4 show that a male thread portion 112 of a predetermined length or more is formed at the end of the guide wire 100, and a female thread portion 402 is formed in the stopper 400 in a hole shape so that the male thread portion 112 may be thread-coupled to the female thread portion 402.

For example, the female thread portion 402 is formed in the center of the stopper 400 to be coupled to the male thread portion 112.

The male thread portion 112 is fastened to the female thread portion 402 in the threaded coupling structure in this manner so that the guide wire 100 and the stopper 400 are easily and conveniently fastened to each other to enhance the assembly performance and productivity of the deployment guide mechanism.

Further, the male thread portion 112 is fastened to the female thread portion 402 in the threaded coupling structure so that the coupling position of the stopper 400 is adjusted within the length range of the male thread portion 112. As a result, the position of the stopper 400 may be adjusted within the length range of the male thread portion 112, and thus the stopper 400 may be coupled to the guide wire 100 at the adjusted position.

Accordingly, the elastic restoring force of the elastic member 500 changes according to the coupling position of the stopper 400 so that the tension of the guide wire 100 may be adjusted.

In addition, in the present invention, one end of the guide holder 110 may be fixed to the guide wire 100, and the male thread portion 112 may be formed at the other end of the guide holder 110.

For example, the male thread portion 112 is formed at one end of the guide holder 110.

A hole is formed along the axis center at the other end of the guide holder 110, and the guide wire 100 is fixedly inserted into the hole.

In other words, the male thread portion 112 may be formed at the end of the guide wire 100 by fixing the guide holder 110 having the male thread portion 112 to the guide wire 100.

In particular, the cross-sectional area of the fixing portion 120 to which the guide wire 100 and the guide holder 110 are fixed may be larger than the cross-sectional area of the male thread portion 112 bordering the fixing portion 120.

In other words, the cross-sectional area of the fixing portion 120 is larger than the cross-sectional area of the male thread portion 112 so that the stopper 400 is physically caught by the fixing portion 120 when the stopper 400 is maximally thread-coupled toward the fixing portion 120. As a result, not only is the coupling force of the stopper 400 improved, but an excessive movement of the stopper 400 toward the guide wire 100 is prevented.

An example of forming the fixing portion 120 is fixing the fixing portion 120 by swaging so that the cross-sectional area of the fixing portion 120 may be expanded.

In other words, the guide wire 100 and the guide holder 110 are fixed by swaging so that not only does the cross-sectional area of the fixing portion 120 expand, but also the coupling force between the guide wire 100 and the guide holder 110 improves.

On the other hand, FIG. 2 shows that, in the present invention, the housing cap 300 is coupled to one end of the guide housing 200 so that the stopper 400 is supported by the inner surface of the housing cap 300 and that a hollow portion 310 is formed in the center of the housing cap 300 such that the guide wire 100 protruding from the outer surface of the stopper 400 is positioned in the hollow portion 310.

For example, the housing cap 300 is coupled to the guide housing 200 by being fitted onto the outer circumference of the guide housing 200.

The stopper 400 is provided inside the guide housing 200, and the inner diameter of the hollow portion 310 is less than the inner diameter of the guide housing 200 so that the inner diameter of the hollow portion 310 is more protruding in the inner radial direction than the inner diameter of the guide housing 200.

Accordingly, the periphery of the stopper 400 on one side is supported by the peripheral portion of the hollow portion 310.

In contrast, the outer diameter of the guide holder 110 coupled to the stopper 400 may be included within the inner diameter range of the hollow portion 310.

Accordingly, even if the male thread portion 112 formed in the guide holder 110 passes through the stopper 400 and protrudes toward the housing cap 300, the protruding male thread portion 112 is positioned in the hollow portion 310 so that the interference between components during assembly is prevented and the assembly performance improves.

On the other hand, FIG. 2 shows that the elastic member 500 may be a spring having a compression spring structure supported by the stopper 400 in the guide housing 200.

Specifically, one end of the spring 500 may be supported by the stopper 400 and the other end of the spring 500 may be supported by a support plate formed at the other end of the guide housing 200 in a shape bent in the inner radial direction.

In other words, the guide wire 100 passes through the hole formed in the center of the support plate 210 and the spring 500 and is coupled to the stopper 400, and the stopper 400 is supported by the spring 500 in the space between the stopper 400 and the support plate 210.

Figure 6:
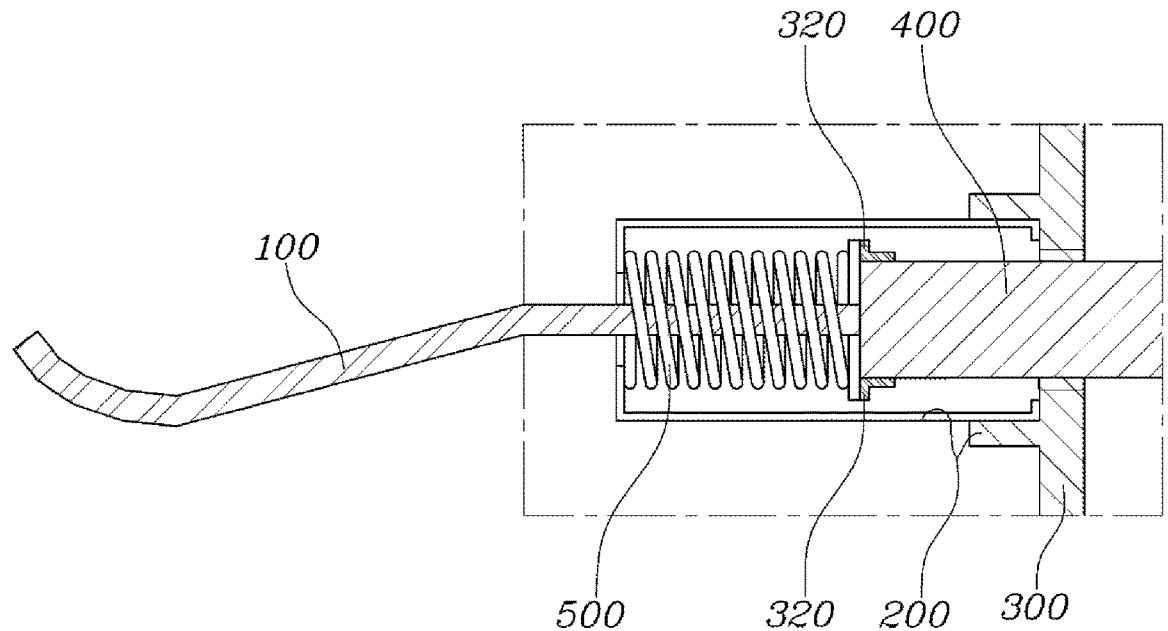
FIGS. 6 and 7 are views for describing the structure and operation of a deployment guide mechanism equipped with a soundproofing member according to the present invention.
Figure 7:
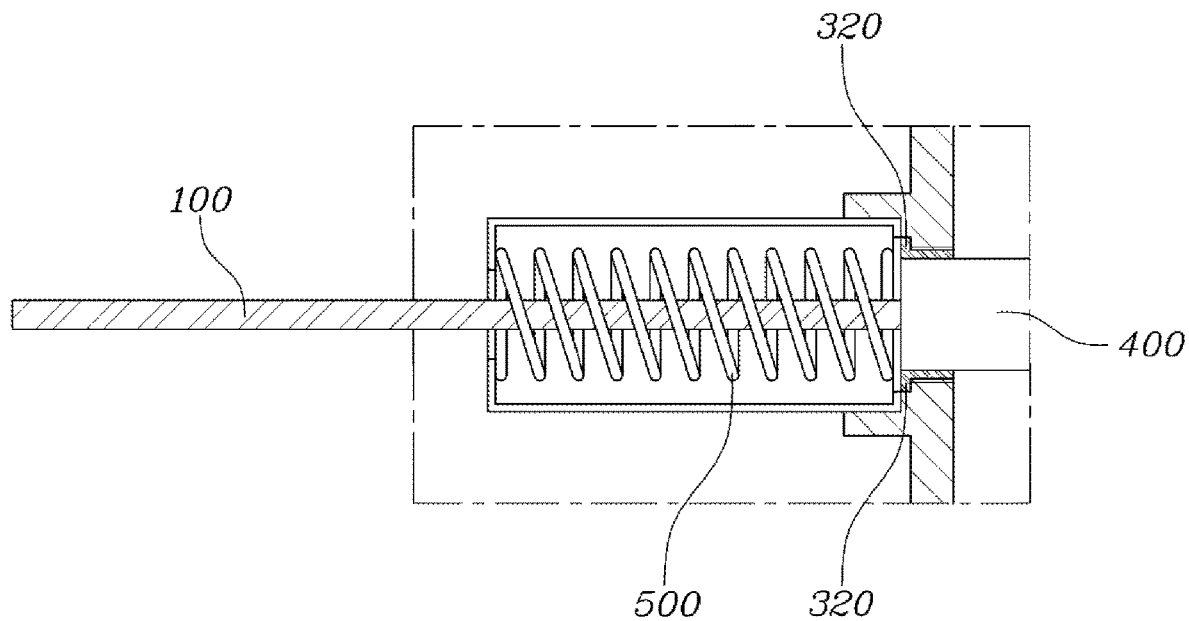

On the other hand, FIGS. 6 and 7 show that the present invention further includes a soundproofing member 320 provided between the guide housing 200 and the stopper 400.

In other words, in the absence of the soundproofing member 320, noise may be generated between the guide housing 200 and the stopper 400 due to vehicle vibrations during the vehicle's operation.

Therefore, a soundproofing member 320 is provided to prevent this.

Specifically, the soundproofing member 320 may be provided on the outer surface of the stopper 400 that is in contact with the housing cap 300 coupled to the guide housing 200.

Figure 8:
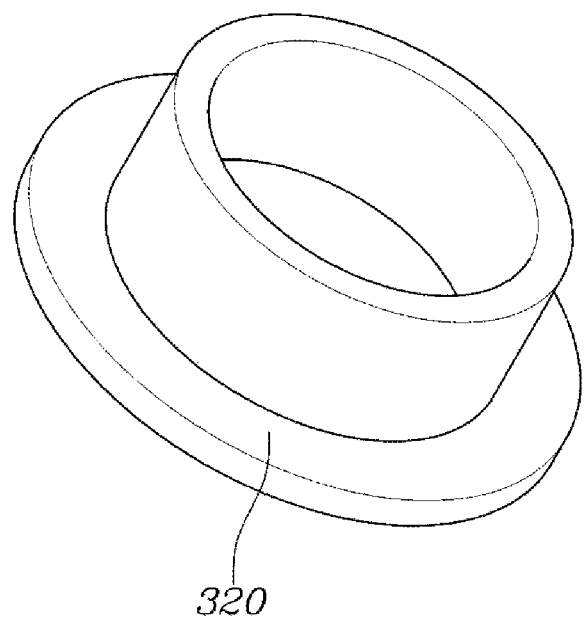
FIGS. 8 and 9 are views illustrating a soundproofing member according to the present invention.

For example, the soundproofing member 320 is formed in a tubular shape with an end extending in the radial direction as shown in FIG. 8, and the housing cap 300 is coupled to one end of the guide housing 200. The soundproofing member 320 may be provided to cover the entire circumferential surface of the stopper 400 that comes into contact with the housing cap 300.

Figure 9:
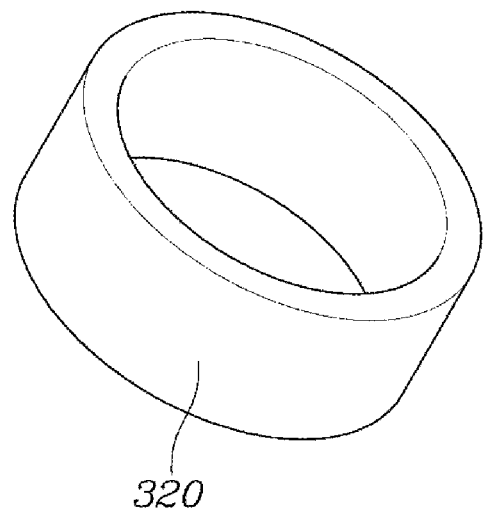

Another example is the soundproofing member 320 which is formed in a cylindrical shape as shown in FIG. 9 and partially covers the circumferential surface of the stopper 400 that comes into contact with the housing cap 300.

Accordingly, damage to the guide wire 100 that guides the deployment of the cushion 12 may be prevented when the cushion 12 deploys, and the generation of noise due to rattles that may occur in the roof airbag may be prevented.

On the other hand, in the present invention, the stopper 400 may also be pulled by the friction resistance generated between the guide wire 100 and the guide ring 13 as the cushion 12 deploys, and the elastic member 500 may also be compressed by the friction resistance.

Specifically, as illustrated in FIG. 6, the guide wire 100 loosens as the elastic member 500 is compressed by the stopper 400. Since the guide ring 13 slides along the loosening guide wire 10, the friction force applied to the guide wire 100 is reduced so that damage to the guide wire 100 by the guide ring 13 may be prevented.

In addition, in the present invention, when the end of the cushion 12 reaches the end portion of the guide wire 100 and the deployment of the cushion 12 is completed, the stopper 400 moves backward by the tensile force of the elastic member 500 and the guide wire 100 may tighten.

Specifically, when the stopper 400 is pushed backward by the tensile force of the elastic member 500 as illustrated in FIG. 7, the guide wire 100 is also pulled by the stopper 400. As a result, the guide wire 100 may tighten and the cushion 12 may evenly deploy in all parts.

Figure 10:
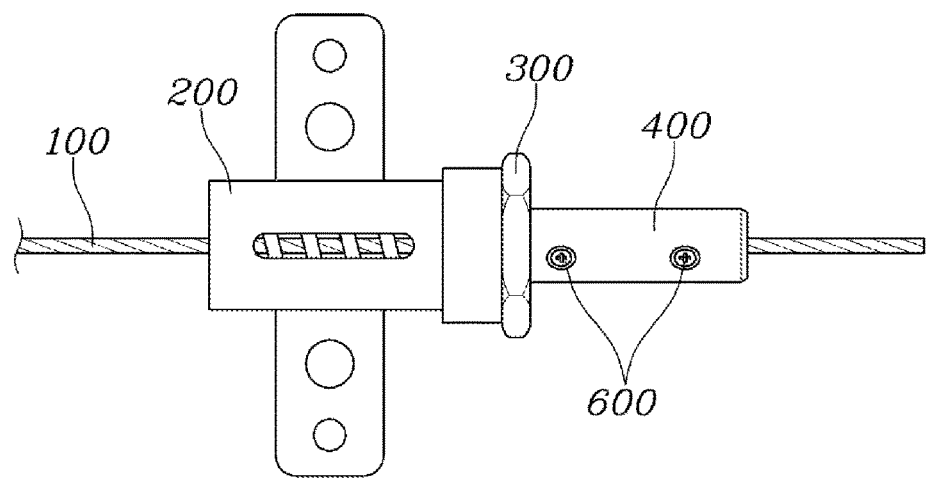
FIG. 10 is a view illustrating an external appearance of a deployment guide mechanism equipped with a fastening device according to the present invention.
Figure 11:
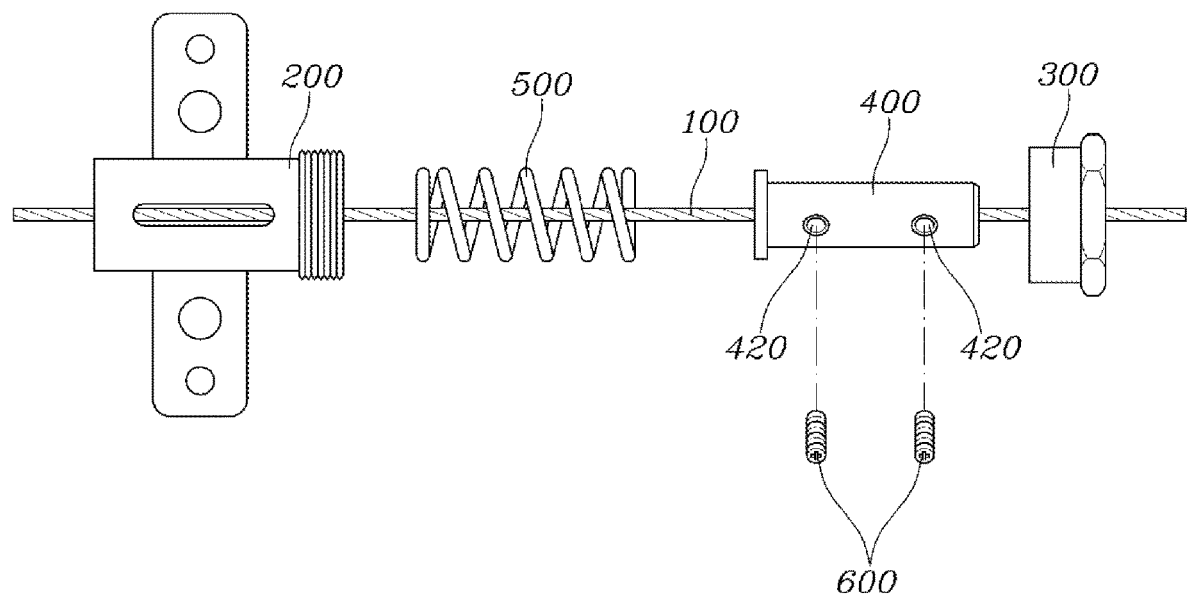
FIG. 11 is a disassembled view of the deployment guide mechanism in FIG. 10.
Figure 12:
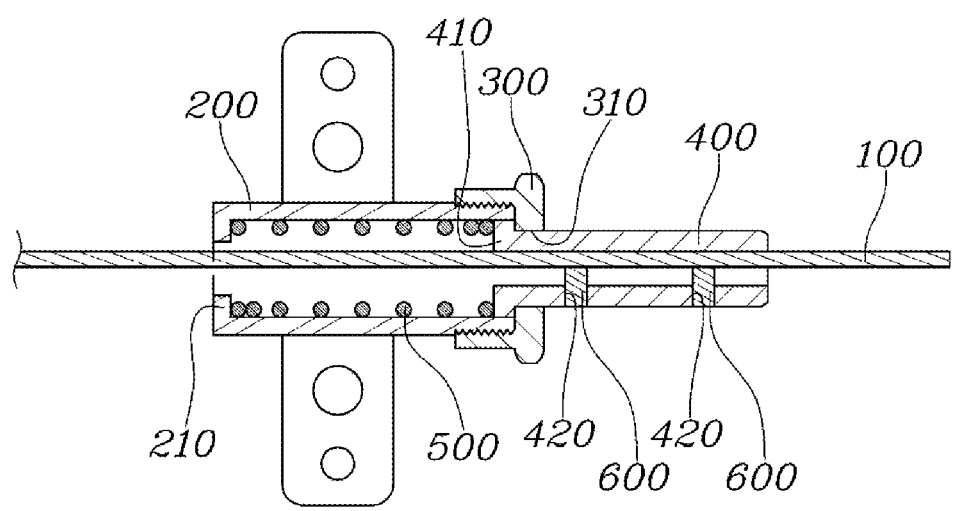
FIG. 12 is a longitudinal view of the deployment guide mechanism in FIG. 10.

On the other hand, as illustrated in FIGS. 10 to 12, in the present invention, the stopper 400 may be fastened to or unfastened from the guide wire 100 by a fastening device.

At this time, the fastening device 600 be configured such that the guide wire 100 and the stopper 400 may be fastened and unfastened repeatedly.

In other words, when there is a need to adjust the tension of the guide wire 100 according to the required performance of the roof airbag, the guide wire 100 and the stopper 400 are unfastened by the fastening device 600 and then refastened after adjusting the position of the stopper 400 so that the position of the stopper 400 may be adjusted in the lengthwise direction of the guide wire 100.

Accordingly, since the tension of the guide wire 100 is easily adjusted only by manipulating the fastening device 600, there is no need to make a new deployment guide mechanism for replacement so that the man-hours for the maintenance of the deployment guide mechanism are reduced and no additional cost is incurred.

On the other hand, in the present invention, a hollow portion is formed in the stopper 400 in the lengthwise direction of the guide wire 100 for the guide wire 100 to pass through the stopper 400, and the fastening device 600 is fastened to the stopper 400 in the direction orthogonal to the guide wire 100 so that the guide wire 100 is pressed against the inner surface of the stopper 400 and fastened thereto.

FIGS. 10 and 12 show that the stopper 400 is formed in a cylindrical shape with open ends so that the guide wire 100 passes through the stopper 400.

The fastening device 600 penetrates the stopper 400 from the outside toward the guide wire 100 and is fastened to the stopper 400.

Accordingly, the fastening device 600 penetrating the stopper 400 applies pressure to the guide wire 100 so that the guide wire comes into close contact with the inner surface of the stopper 400 and thus the guide wire 100 is fastened to the stopper 400.

In addition, a fastening hole 420 may be formed in the stopper 400, and the fastening device 600 may be fastened to the fastening hole 420 in a threaded fastening structure.

Specifically, two or more fastening holes 420 may be formed in the direction orthogonal to the lengthwise direction of the stopper 400, and a female thread may be formed on the inner surface of the fastening holes 420.

The fastening device 600 may be a bolt fastened to the fastening hole 420 in the threaded fastening structure.

Thus, as the bolt 600 is fastened to the fastening hole 420, pressure is applied to the guide wire 100 so that the guide wire 100 comes into close contact with the inner surface of the stopper 400, and thus the guide wire 100 and the stopper 400 are fastened to each other.

The stopper 400 and the guide wire 100 are easily fastened and unfasted by the threaded fastening of the bolt 600 in this manner so that the fastening position of the stopper 400 is conveniently adjusted within the length range of the guide wire 100.

Accordingly, the tension of the guide wire 100 changes according to the coupling position of the stopper 400 so that the tension of the guide wire may be easily and conveniently adjusted.

In addition, one end of the stopper 400 is supported in the guide housing 200 and the other end of the stopper 400 extends toward the other end of the roof portion 1 such that the extending portion is exposed to the outside of the guide housing 200, and the fastening device 600 may be fastened to the extending portion.

FIGS. 11 and 12 show that one end of the stopper 400 is formed in a flange shape extending in the radial direction to engage the inner surface of the housing cap 300 to be described below so that one end of the stopper 400 is supported in the guide housing 200.

The stopper 400 passes through the housing cap 300 to extend toward the rear of the roof portion 1.

At this time, the extending portion is positioned outside the guide housing 200 and the housing cap 300, and the fastening hole 420 is formed in the extending portion such that the fastening hole 420 is exposed to the outside.

Accordingly, when the bolt 600 is fastened to or unfastened from the fastening hole 420, the fastening operation may be performed without interference from the guide housing 200 and the housing cap 300 so that the convenience of the fastening operation is enhanced and the tension of the guide wire 100 is adjusted more easily and conveniently.

On the other hand, in the present invention, the housing cap 300 is coupled to one end of the guide housing 200 and the stopper 400 is supported by the inner surface of the housing cap 300. A hollow portion is formed in the housing cap 300 in the lengthwise direction of the guide wire 100 so that one end of the stopper 400 is supported by the inner surface of the housing cap 300 and the other end of the stopper 400 passes through the housing cap 300.

FIGS. 11 and 12 show that the housing cap 300 is coupled to the guide housing 200 by being fitted onto the outer circumference surface the guide housing 200.

A hollow portion 310 is formed in the center of the housing cap 300, and the inner diameter of the hollow portion 310 is less than the outer diameter of the flange portion 410 formed at the end of the stopper 400.

Accordingly, the flange portion 410 is supported by the peripheral portion of the hollowing portion 310 so that one end of the stopper 400 is supported by the inner surface of the housing cap 300.

The process of assembling the deployment guide mechanism illustrated in FIG. 2 will be described below.

First, the spring 500 is built into the guide housing 200.

Next, the guide wire 100 is passed through the guide housing 200 and the spring 500.

Then, the stopper 400 is thread-coupled to the end of the guide wire 100 and the housing cap 300 is coupled to the guide housing 200.

Subsequently, the stopper 400 is pushed through the hollow portion 310 in the compression direction of the spring 500 so that the spring 500 is compressed in the guide housing 200.

Afterward, the front end of the guide wire 100 is coupled to the roof frame 11, the pressure applied to the stopper 400 is released, and then the guide wire 100 moves in the direction of elastic restoration of the spring 500 by the elastic restoring force of the spring 500.

As a result, tension is created in the guide wire 100, and the assembly of the deployment guide mechanism is completed.

As described above, the present invention greatly improves the assembly performance and productivity of the deployment guide mechanism by assembling the stopper 400 onto the guide wire 100 in the threaded coupling structure so that the guide wire 100 and the stopper 400 are easily assembled.

Further, the coupling position of the stopper 400 may be adjusted through the thread coupling structure between the guide wire 100 and the stopper 400. Accordingly, the elastic restoring force of the elastic member 500 changes according to the coupling position of the stopper 400 so that the tension of the guide wire 100 may be adjusted.

Next, the assembling process of the deployment guide mechanism illustrated in FIGS. 10 to 12 will be described.

First, the compression spring 600 is built into the guide housing 200, and the stopper 400 is inserted into the guide housing 200 in the compression direction of the compression spring 600.

Next, assemble the housing cap 300 onto the end of the guide housing 200 and pressure is applied to the stopper 400 in the compression direction of the compression spring 600.

Then, the guide wire 100 is passed through the guide housing 200 and the stopper 400.

Subsequently, the front end of the guide wire 100 is coupled to the roof frame 11 and the bolt 600 is fastened to the fastening hole 420 formed in the stopper 400 so that the bolt 600 presses the guide wire 100 against the inner surface of the stopper 400 and thus the stopper 400 is coupled to the guide wire 100.

Accordingly, tension is created in the guide wire 100 and the assembly of the deployment guide mechanism is completed.

As described above, in the present invention, when there is a need to adjust the tension of the guide wire 100 according to the required performance of the roof airbag, the bolt 600 loosens to release the coupling between the guide wire 10 and the stopper 400, the position of the stopper 400 is adjusted, and then the bolt 600 is refastened so that the position of the stopper 400 may be adjusted in the lengthwise direction of the guide wire 100.

In this way, since the tension of the guide wire 100 is easily adjusted by simply manipulating the fastening device 600, there is no need to make a new deployment guide mechanism for replacement so that the man-hours for the maintenance of the deployment guide mechanism are reduced and no additional cost is incurred.

Specific embodiments of the present invention have been described in detail, but it will be obvious to those skilled in the art that various modifications and amendments are possible within the scope of the technical spirit of the present invention and it is natural that such modifications and amendments belong to the accompanying claims.

What is claimed is:

1. A roof airbag device comprising:
   a guide wire fixed to a first side of a roof portion, the guide wire extending in a lengthwise direction in which a roof airbag deploys;
   a guide housing fixed to a second side of the roof portion, the second side being opposite the first side;
   a stopper supported in the guide housing and coupled to an end of the guide wire; and an elastic member configured to provide an elastic restoring force to the stopper in the lengthwise direction toward the second side of the roof portion, wherein:

a housing cap is coupled to one end of the guide housing, the stopper is supported by an inner surface of the housing cap, and the housing cap defines a hollow portion in the center of the housing cap into which the guide wire protruding from the outer surface of the stopper is received.

2. The device of claim 1, wherein:

the guide wire has an end that includes a male thread portion, the male thread portion having a predetermined length, and the stopper defines a female thread portion configured to receive the male thread portion in a thread-coupled manner.

3. The device of claim 2, wherein:

a guide holder end is fixed to the end of the guide wire, and the guide holder includes the male thread portion.

4. The device of claim 3, further comprising:

a fixing portion to which the guide wire and the guide holder are fixed, the fixing portion having a cross-sectional area that is larger than a cross-sectional area of the male thread portion.

5. The device of claim 4, wherein the fixing portion is fixed to the guide wire and the guide holder by swaging.

6. The device of claim 1, wherein the elastic member is a spring supported by the stopper in the guide housing.

7. The device of claim 6, wherein:

the guide housing includes a support plate at an opposite end of the guide housing from the housing cap, and the spring is arranged between the stopper and the support plate.

8. The device of claim 7, further comprising a soundproofing member disposed between the guide housing and the stopper.

9. The device of claim 8, wherein the soundproofing member is disposed on an outer surface of the stopper in position to contact the housing cap.

10. The device of claim 8, wherein, when the roof airbag deploys, the guide wire pulls the stopper and causes the stopper to compress the elastic member against the support plate.

11. The device of claim 1, wherein the tensile force of the elastic member pushes the stopper toward the housing cap when the deployment of the roof airbag is completed.

12. The device of claim 1, wherein the stopper is fastened to or unfastened from the guide wire by a fastening device.

13. A roof airbag device comprising:

a guide wire fixed to a first side of a roof portion, the guide wire extending in a lengthwise direction in which a roof airbag deploys;

a guide housing fixed to a second side of the roof portion, the second side being opposite the first side;

a stopper supported in the guide housing and coupled to an end of the guide wire;

an elastic member configured to provide an elastic restoring force to the stopper in the lengthwise direction toward the second side of the roof portion; and wherein:

the stopper is fastened to or unfastened from the guide wire by a fastening device, the stopper defines a hollow portion through which the guide wire extends, and the fastening device extends through the stopper into the hollow portion and presses the guide wire against the inner surface of the stopper to fasten the guide wire to the stopper.

14. The device of claim 13, wherein the stopper includes a fastening hole through which the fastening device is extended to press the guide wire against the inner surface of the stopper.

15. The device of claim 13, wherein:

the stopper extends out of the guide housing such that an extending portion of the stopper is disposed outside of the guide housing, and the fastening device is fastened to the extending portion.

16. The device of claim 15, wherein:

a housing cap is coupled to one end of the guide housing, the stopper is supported by an inner surface of the housing cap, and the housing cap defines a hollow portion formed in the housing cap through which the extending portion of the stopper extends.

* * * * *